United States Patent
Lee et al.

(10) Patent No.: US 8,737,716 B2
(45) Date of Patent: May 27, 2014

(54) MOBILE COMMUNICATION DEVICE AND METHOD FOR IDENTIFYING A COUNTERFEIT BILL

(75) Inventors: Dong-Hyuk Lee, Seoul (KR); Do-Hyeon Kim, Gyeonggi-do (KR); Dong-Chang Lee, Daegu (KR); Seong-Taek Hwang, Gyeonggi-do (KR); Ki-Yeung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 181 days.

(21) Appl. No.: 13/439,480

(22) Filed: Apr. 4, 2012

(65) Prior Publication Data

US 2012/0288182 A1 Nov. 15, 2012

(51) Int. Cl.
*G06K 9/00* (2006.01)
*G07F 7/04* (2006.01)
*G09B 19/18* (2006.01)

(52) U.S. Cl.
USPC .......................... 382/135; 194/206; 434/110

(58) Field of Classification Search
USPC ......... 382/135, 136, 137, 138, 139, 209, 218; 194/206, 328; 902/7, 15, 17, 28; 235/375, 454, 468, 494; 434/110
See application file for complete search history.

(56) References Cited

U.S. PATENT DOCUMENTS

| | | | |
|---|---|---|---|
| 7,856,137 B2 * | 12/2010 | Yonezawa et al. | 382/136 |
| 2008/0283612 A1 * | 11/2008 | Fearn | 235/468 |
| 2010/0144387 A1 | 6/2010 | Chou | |
| 2010/0195918 A1 | 8/2010 | Yonezawa et al. | |

FOREIGN PATENT DOCUMENTS

| | | |
|---|---|---|
| EP | 1 168 253 | 1/2002 |
| JP | 2004054758 | 2/2004 |

\* cited by examiner

*Primary Examiner* — Abolfazl Tabatabai
(74) *Attorney, Agent, or Firm* — The Farrell Law Firm, P.C.

(57) ABSTRACT

A mobile communication device and method for identifying a counterfeit bill are provided. In the method, an InfraRed (IR) image of a bill is received, feature values are extracted from the IR image to represent edges, a binary image having displayed pixels and non-displayed pixels is generated based on the feature values, and a corrected image is generated by overlaying the binary image on a pre-stored real bill database and adjusting the binary image to match a predetermined area of the binary image matches to the predetermined area of the real bill database. A number of displayed pixels in the corrected image is counted, and whether the bill is counterfeit is based on the number of displayed pixels in the corrected image.

23 Claims, 14 Drawing Sheets

MOBILE COMMUNICATION DEVICE AND METHOD FOR IDENTIFYING A COUNTERFEIT BILL

PRIORITY

This application claims priority under 35 U.S.C. §119(a) to Korean Patent Application Serial No. 10-2011-0044270, which was filed in the Korean Intellectual Property Office on May 11, 2011, the entire content of which is incorporated herein by reference.

BACKGROUND OF THE INVENTION

1. Field of the Invention

The present invention relates generally to mobile communication device and method for identifying a counterfeit bill, and more particularly, to a mobile communication device a method and for identifying a counterfeit bill using InfraRed (IR) light.

2. Description of the Related Art

Extensive research has recently been conducted on methods and devices for identifying counterfeit bills. Conventionally, identification of counterfeit bills is performed through visual inspection. However, it is difficult to determine whether a bank note or bill is counterfeit without having prior knowledge of features used to prevent forgery, tampering, or counterfeiting of bank notes or bills.

When a conventional bill counter uses an IR counterfeit detection technique, a bill image can be acquired by the same illumination at a fixed position through a loading machine attached to the bill counter. Therefore, the bill image may avoid an illumination change and a geometrical distortion.

Counterfeit detection devices and methods using a mobile IR camera are currently being studied. However, a shortcoming of using a mobile IR camera is that it is significantly affected by a user's capturing motion or an ambient environment. For example, the information of a bill image captured from a mobile IR camera is likely to be degraded due to user hand tremors, lens characteristics, or an ambient illumination environment depending on an image capturing position.

SUMMARY OF THE INVENTION

The present invention is designed to address at least the problems and/or disadvantages described above and to provide at least the advantages described below.

Accordingly, an aspect of the present invention is to provide a mobile communication device and method for identifying a counterfeit bill by suppressing effects of user capturing motion or an ambient environment.

In accordance with an embodiment of the present invention, a method for identifying a counterfeit bill is provided, in which an InfraRed (IR) image of a bill is received, feature values are extracted from the IR image to represent edges, a binary image having displayed pixels and non-displayed pixels is generated based on the feature values, a corrected image is generated by overlaying the binary image on a pre-stored real bill database and adjusting the binary image to match a predetermined area of the binary image to a predetermined area of the real bill database, a number of displayed pixels in the corrected image is counted, and whether the bill is counterfeit is based on the number of displayed pixels in the corrected image.

In accordance with another embodiment of the present invention, a method for identifying a counterfeit bill is provided, in which an IR image of a bill is received, feature values representing edges are extracted from the IR image, a binary image having displayed pixels and non-displayed pixels is generated based on the feature values, a corrected image is generated by overlaying the binary image on a pre-stored real bill database and adjusting the binary image to match a predetermined area of the binary image matches to a predetermined area of the real bill database, a pre-stored counterfeit bill database having displayed pixels and non-displayed pixels is overlaid on the corrected image, and whether the bill is counterfeit is based on a matching rate between the displayed pixels of the corrected image and the displayed pixels of the counterfeit bill database.

In accordance with another embodiment of the present invention, a mobile communication device is provided in which a camera module receives an IR image of a bill, a memory stores a real bill database, a processor extracts feature values to represent edges from the IR image, generates a binary image having displayed pixels and non-displayed pixels based on the feature values, generates a corrected image by overlaying the binary image on the real bill database read from the memory and adjusting the binary image to match a predetermined area of the binary image matches to a predetermined area of the real bill database, counts the number of displayed pixels in the corrected image, and determines whether the bill is counterfeit based on the number of displayed pixels in the corrected image, and an output unit notifies that the bill is probably counterfeit.

In accordance with a another embodiment of the present invention, a mobile communication device is provided in which a camera module captures an IR image of a bill, a memory stores a real bill database and a counterfeit bill database having displayed pixels and non-displayed pixels, a processor extracts feature values representing edges from the IR image, generates a binary image having displayed pixels and non-displayed pixels based on the feature values, generates a corrected image by overlaying the binary image on the real bill database read from the memory and adjusting the binary image to match a predetermined area of the binary image matches to a predetermined area of the real bill database, overlays the counterfeit bill database on the corrected image, and determines whether the bill is counterfeit based on a matching rate between the displayed pixels of the corrected image and the displayed pixels of the counterfeit bill database.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
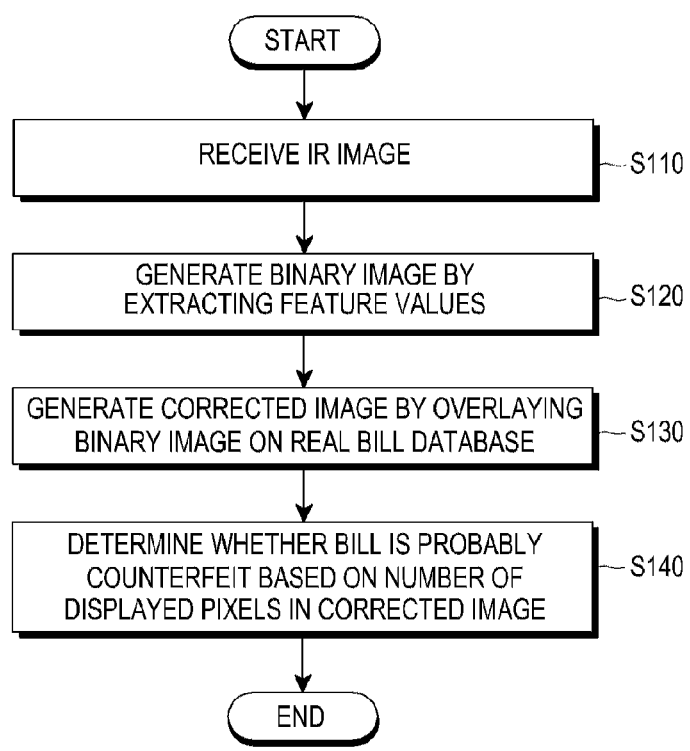
FIG. 1 is a flowchart illustrating a counterfeit bill identifying method in a mobile communication device according to an embodiment of the present invention.

FIG. 1 is a flowchart illustrating a counterfeit bill identifying method in a mobile communication device according to an embodiment of the present invention. The mobile communication device includes a light receiver like a camera and an InfraRed (IR) emitter.

Additionally, the mobile communication device is capable of communicating with a Base Station (BS) or another mobile communication device. For example, the mobile communication device may be a portable phone or a smart phone. However, it is to be clearly understood that the counterfeit bill identifying method illustrated in FIG. 1 is not limited to a mobile communication device.

Referring to FIG. 1, the mobile communication device receives a captured IR image of a bank note or bill (hereinafter, referred to simply as a "bill") in step S110. For example, the mobile communication device may operate in a counterfeit detection mode according to a user's manipulation.

More specifically, when the mobile communication device enters the counterfeit detection mode, ian IR light is projected onto the bill. The IR light is an electromagnetic wave in a wavelength range of about 760 nm to 50000 nm. For example, the mobile communication device may include a 830-nm GaAs semiconductor laser, a 1300-nm or 1060-nm Nd-YAG or Ndglass laser, a 2800-nm HF laser, a 5000-nm CO laser, a 10600-nm CO2 laser, a 16000-nm SF6 laser, or a far-IR laser having a wavelength ranging from tens of nanometers to hundreds of nanometers. Thus, IR light at the above various wavelengths is projected onto the bill.

The mobile communication device receives the IR image reflected from the bill using the light receiver, e.g., a camera. The light receiver receives an electromagnetic wave in the wavelength range of visible light and IR light.

In step S120, the mobile communication device generates a binary image expressed as binary values by extracting feature values from the IR image captured in step S110.

Feature values refer to a value assigned to each pixel in an IR image. If the IR light is received at a pixel, the pixel has a value of 1. If the IR light is not received at the pixel, the pixel has a value of 0. Therefore, the mobile communication device generates a binary image expressed as binary values based on the feature values. That is, the binary image is composed of displayed pixels set to the feature value 1 and non-displayed pixels set to the feature value 0.

Additionally, the feature values may be specialized to effectively represent the features of each object included in the IR image.

After generating the binary image, the mobile communication device generates a corrected image by overlaying the binary image on a real bill database in step S130.

More specifically, the mobile communication device overlays the binary image on a pre-stored real bill database formed by projecting IR light onto a real bill and capturing IR light reflected from the real bill. The real bill database is an accurate IR image of the real bill from which the effects of a user's capturing motion or ambient illumination are eliminated. The real bill database may be pre-stored in the mobile communication device.

The mobile communication device generates the corrected image by moving, rotating, enlarging, or contracting the binary image to match a predetermined area of the binary image matches to a predetermined area (i.e., a corresponding area) of the real bill database. That is, an object common to the IR images of a real bill and a counterfeit bill is set as the predetermined area.

Additionally, the mobile communication device may correct the binary image so that the predetermined area of the real bill database accurately matches to the predetermined area of the binary image. More specifically, the mobile communication device may move the binary image up, down, to the left, or to the right for a predetermined distance or for a multiple of the predetermined distance. Further, the mobile communication device may rotate the binary image clockwise or counterclockwise at a predetermined angle or at a multiple of the predetermined angle, and/or may enlarge or contract the binary image at a predetermined ratio or at a multiple of the predetermined ratio.

Accordingly, the mobile communication device generates the corrected image by correcting the binary image through movement, rotation, enlargement, and/or contraction, such that the predetermined area of the real bill database accurately matches to the predetermined area of the moved, rotated, enlarged, or contracted binary image.

In step S140, the mobile communication device determines whether the bill is counterfeit, based on the number of displayed pixels included in the corrected image.

A counterfeit bill database and a real bill database may differ in the number of displayed pixels. For example, the counterfeit bill database may have a relatively large number of displayed pixels, whereas the real bill database may have a relatively small number of displayed pixels.

If the binary image has a relatively large number of displayed pixels, the mobile communication device determines that the bill is counterfeit. However, if the binary image has a relatively small number of displayed pixels, the mobile communication device determines that the bill is real.

Further, the mobile communication device may determine the counterfeit probability of the bill according to a ratio of the number of displayed pixels in the binary image to a sum of the number of displayed pixels of the counterfeit bill database and the number of displayed pixels of the real bill database.

Although not illustrated in FIG. 1, if the mobile communication device determines that the bill is real, according to the number of displayed pixels of the binary image, the mobile communication device may further overlay the pre-stored counterfeit bill database on the corrected image and confirm whether the bill is not counterfeit based on a displayed pixel matching ratio between the corrected image and the counterfeit bill database.

As described above, in accordance with an embodiment of the present invention, the mobile communication device corrects a user captured IR image to accurately match it to a database, even though the user did not capture an accurate database-matching image.

Furthermore, the present invention is useful to a mobile communication device for which it is difficult to install a high-performance computation unit because it can determine whether a bill is counterfeit using the number of displayed pixels included in a counterfeit bill database, the number of displayed pixels included in a real bill database, and the number of displayed pixels included in a collected binary image, without the need for a complex algorithm.

Figure 2A:
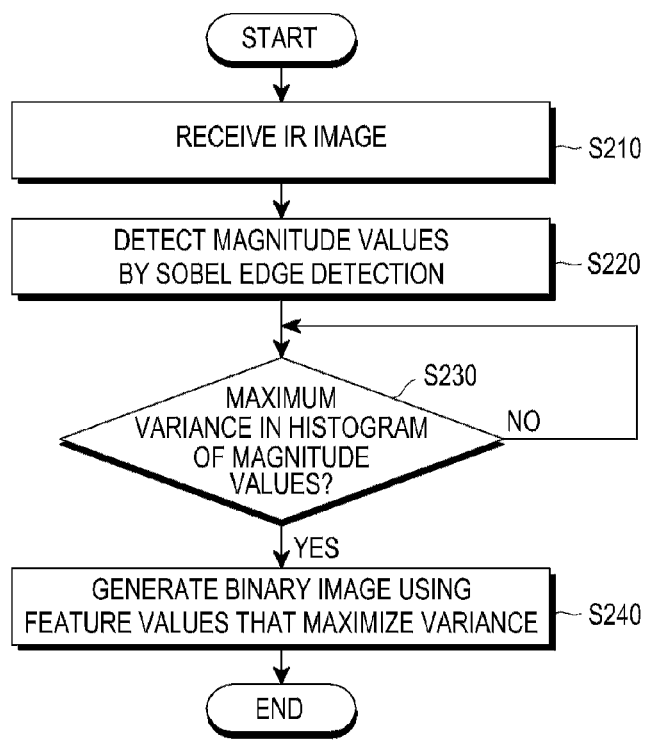
FIG. 2A is a flowchart illustrating a method for generating a binary image according to an embodiment of the present invention.

FIG. 2A is a flowchart illustrating a method for generating a binary image according to an embodiment of the present invention. For example, the binary image generation method corresponds to step S120 in FIG. 1.

Referring to FIG. 2A, in step S210, the mobile communication device receives an IR image of a bill. According to an embodiment of the present invention, the mobile communication device detects a magnitude value of each pixel in the IR image by, for example, Sobel edge detection, in order to extract feature values from the received IR image. The mobile communication device may detect edges as an example of feature values of the IR image based on the detected magnitude values.

An edge refers to a boundary of a specific object or area in the IR image and the mobile communication device may detect non-continuous points in pixel brightness, for edge detection.

For edge detection, the mobile communication device may calculate gradients of the IR image. Because the brightness of the IR image rapidly changes at an edge, an area having a large gradient may be determined to be an edge.

A Sobel operator may be about a primary gradient among the gradients of the IR image. Equation (1) describes a two-dimensional gradient of a pixel (x, y) in a two-dimensional image.

$$\nabla I = \begin{bmatrix} \nabla x \\ \nabla y \end{bmatrix} = \begin{bmatrix} \frac{\partial I}{\partial x} \\ \frac{\partial I}{\partial y} \end{bmatrix} \quad (1)$$

The gradient vector of the pixel (x, y) indicates a direction of a maximum variation rate of I. The absolute value of a vector for edge detection, is expressed as shown in Equation (2).

$$\nabla I = \mathrm{mag}(\nabla I) = [(\nabla x)^2 + (\nabla y)^2]^{1/2} \quad (2)$$

Based on Equations (1) and (2), differentiation may be implemented into the following digital form of Equation (3).

$$\nabla I(m, n) = mag(\nabla I(m, n)) \quad (3)$$
$$= [(\nabla x(m, n))^2 + (\nabla y(m, n))^2]^{1/2} \text{ or }$$
$$|\nabla x(m, n))^2 + (\nabla y(m, n))^2|$$

In Equation (3), (m, n) denotes a vertical and horizontal position on the image, which can be given using Equation (4).

$$\nabla x(m,n)=I(m-1,n)-I(m,n) \text{ or } I(m,n)-I(m-1,n) \text{ or } I(m-1,n)-I(m-1,n) \quad (4)$$

The Sobel edge detection method can provide image differences and flattening effects using a type of gradient operator. The resulting noise mitigation may lead to suppression of the effects of an ambient environment, for example, illumination-caused noise.

Figure 2B:
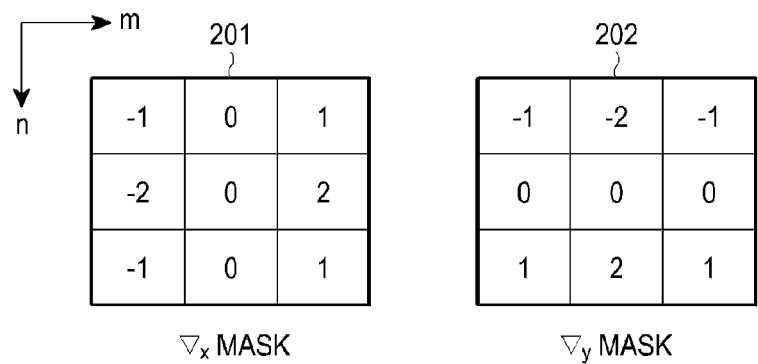
FIG. 2B illustrates masks used for feature detection by a Sobel edge detection method according to an embodiment of the present invention.

FIG. 2B illustrates masks used in a Sobel edge detection method according to an embodiment of the present invention. The masks may be expressed as shown in Equations (5) and (6).

$$\nabla x(m,n)=[I(m-1,n+1)+2I(m+1,n)+I(m+1,m-1)]-[I(m-1,n+1)+2I(m-1,n)+I(m-1,n-1)] \quad (5)$$

$$\nabla y(m,n)=[I(m+1,n+1)+2I(m,n+1)+I(m-1,n+1)]-[I(m-1,n-1)+2I(m,n-1)+I(m-1,n-1)] \quad (6)$$

The mobile communication device can calculate magnitude values representing edges that are the contours of specific areas or objects in the IR image in the above operation.

To more efficiently suppress the effects of an ambient environment, the mobile communication device may use a threshold method that maximizes variances on a magnitude value histogram.

Figure 2C:
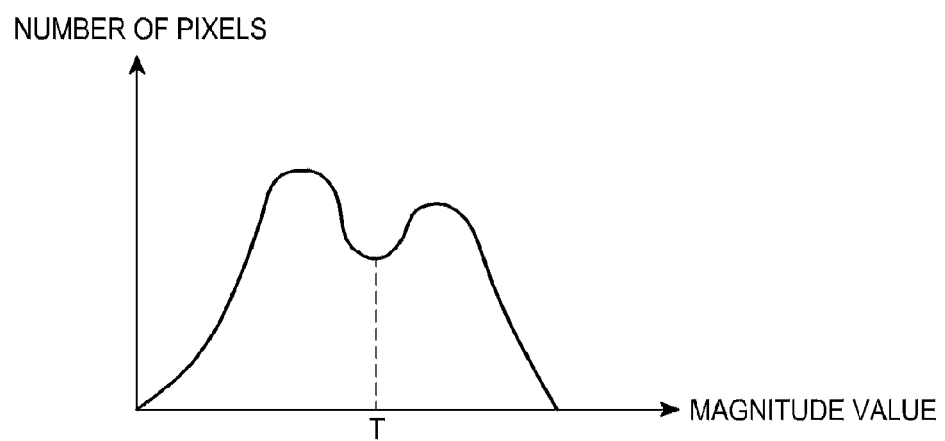
FIG. 2C illustrates a histogram of magnitude values according to an embodiment of the present invention.

FIG. 2C illustrates a histogram of magnitude values according to an embodiment of the present invention.

Referring to FIG. 2C, the magnitude value histogram has twin peaks and a valley point set as a threshold. That is, the histogram is divided into two classes and a magnitude value that divides the histogram into the two classes is set as a threshold. The total variance of the histogram may be expressed as a sum of an intra-class variance and an inter-class variance. The intra-class variance may be given in Equation (7).

$$\sigma_w^2(t)=w1(t)\sigma_1^2(t)+w2(t)\sigma_2^2(t) \quad (7)$$

In Equation (7), w1 and w2 denote weights.

Specifically, Equation (7) expresses the intra-class variance as a sum of a product between a variance of class 1 and weight 1 and a product between a variance of class 2 and weight 2.

For more accurate edge detection, a more accurate threshold should be calculated and thus the variances of both classes should be small. That is, an accurate threshold can be calculated by calculating a minimum intra-class variance. The inter-class variance may be given as shown in Equation (8).

$$\sigma_b^2(t) = \sigma^2 - \sigma_w^2(t) = w1 w2 [\mu_1(t) - \mu_2(t)]^2 \quad (8)$$

In Equation (8), μ1 and μ2 are average values of the classes, respectively.

In accordance with an embodiment of the present invention, the mobile communication device calculates a threshold that maximizes a total variance, assigns "1" to pixels having magnitude values equal to or larger than the threshold and "0" to pixels having magnitude values smaller than the threshold, thereby generating a binary image having displayed pixels and non-displayed pixels.

Accordingly, the mobile communication device forms a binary image representing a contour of a specific area or object in an IR image.

Figure 2D:
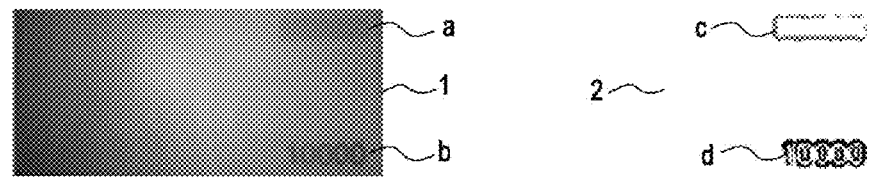
FIGS. 2D and 2E illustrate binary images generated by a mobile communication device according to an embodiment of the present invention.
Figure 2E:
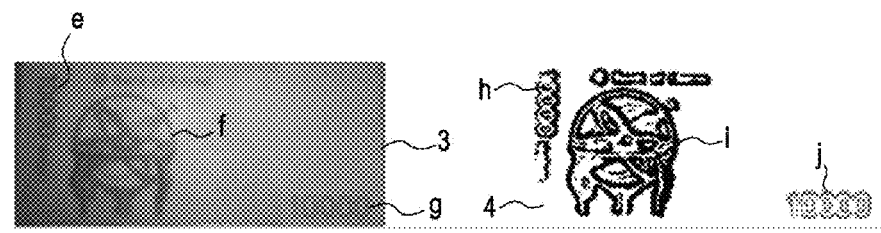

FIGS. 2D and 2E illustrate binary images generated in a mobile communication device according to an embodiment of the present invention. Specifically, in FIG. 2D, reference numerals 1 and 2 denote an IR image and binary image of a real bill, respectively, and in FIG. 2E, reference numerals 3 and 4 denote an IR image and binary image of a counterfeit bill, respectively.

Referring to FIG. 2D, the IR image 1 of a 10,000-won Bank of Korea bill has a numeral denomination object b, "10000", at the bottom right-hand corner and a rectangular-alike object a at the top right-hand corner. A counterfeit bill has an increased amount of ink that produces prints on it. Therefore, the amount of carbon sprayed on the surfaces of the counterfeit bill increases, thereby causing a difference between the IR images of the counterfeit bill and a real bill.

In addition, there is a dark captured area at the left side of the IR image 1. Those skilled in the art will understand that the same operation is applicable to Bank of Korea bills or checks with other denominations and bank bills or checks of other nations.

Because a conventional counterfeit bill identifying device does not take an external environment such as changed illumination into account, it regards the left area of the IR image as a certain object in detecting edges. In contrast, a counterfeit bill identifying method according to an embodiment of the present invention determines feature values using Sobel edge detection in a manner that maximizes variances, taking into account an external environment such as a local illumination change. Therefore, as noted from the right side of FIG. 2D, only the edges of bottom right-hand and top right-hand objects c and d are detected.

The IR image 3 and binary image 4 of a counterfeit 10,000-won Bank of Korea bill are illustrated in FIG. 2E.

Referring to FIG. 2E, the counterfeit Bank of Korea bill includes a numeric denomination object g, "10000", at the bottom right-hand corner, and another vertical denomination object e, "10000 won", and a rain gauge object f at the left side in the IR image 3.

In the binary image 4 corresponding to the IR image 3 of the counterfeit bill at the right side of FIG. 2E, there is an edge j of the numeric denomination object "10000" at the bottom right-hand corner, and an edge h of the vertical denomination object "10000 won" and an edge i of the rain gauge object at the right side.

For example, the binary images of the counterfeit bill and the real bill commonly include the edge of the bottom right-hand numeric denomination object "10000". The binary image of the real bill further includes the edge of the top right-hand rectangular object, whereas the binary image of the counterfeit bill further includes the edge of the left-side vertical denomination object "10000 won" and the edge of the rain gauge object.

As the mobile communication device generates a binary image as described above, effects of an ambient environment, such as external illumination, can be minimized. Therefore, the mobile communication device can accurately extract objects for counterfeit detection in the IR image and generate a binary image of the extracted objects.

Figure 3A:
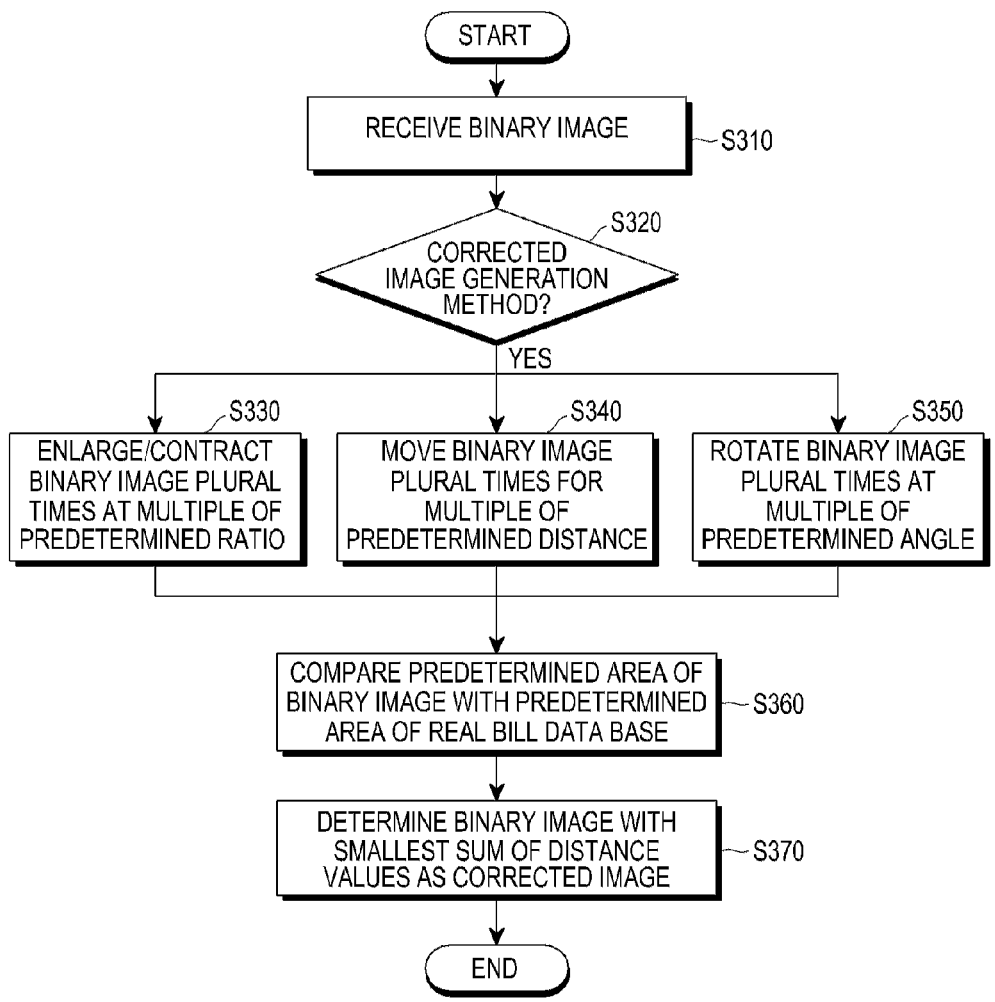
FIG. 3A is a flowchart illustrating a method for correcting a binary image according to an embodiment of the present invention.

FIG. 3A is a flowchart illustrating a method for correcting a binary image according to an embodiment of the present invention.

Referring to FIG. 3A, the mobile communication device generates a binary image in step S310. The mobile communication device may determine how to generate a corrected image out of the binary image, for comparison with a pre-stored database in step S320. In accordance with an embodiment of the present invention, the mobile communication device may generate the corrected image using three different methods.

In step S330, the mobile communication device generates the corrected image by enlarging or contracting the binary image a plurality of times at a multiple of a predetermined ratio.

More specifically, the mobile communication device may read out a pre-stored real bill database in which a distance value is assigned to each pixel, where the distance value represents a distance between the pixel and a displayed pixel. As described above, the real bill database is a binary image formed based on an IR image of a real bill by minimizing external factors. For example, a real 10000-won Bank of Korea bill includes the edge of a numeric denomination object "10000" on the bottom right-hand corner of the bill. Further, a counterfeit bill database also includes the edge of the numeric denomination object "10000" on the bottom right-hand corner of the bill.

The mobile communication device reads the pre-stored real bill database and compare the real bill database with the binary image in a predetermined area. For example, the predetermined area may be a part of the numeric denomination object "10000", as illustrated in FIG. 3B.

Figure 3B:
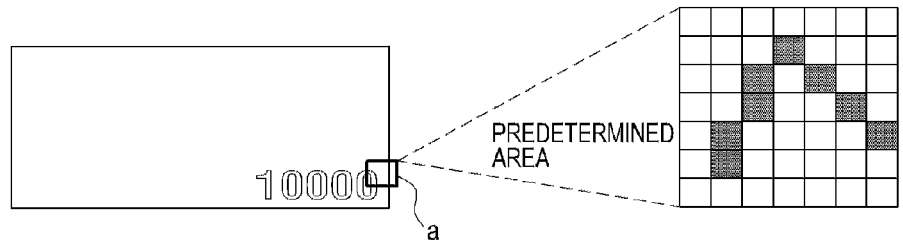
FIG. 3B is a conceptual view illustrating a predetermined area of a real bill database according to an embodiment of the present invention.

Referring to FIG. 3B, the predetermined area is a part of an object common to the real bill database and the counterfeit database. For example, in FIG. 3B, the predetermined area is the numeric denomination object "10000" at the bottom right-hand corner of the bill. For instance, the predetermined area may range from pixel 280 to 286 in width by pixel 894 to pixel 900 in length in 300×900 pixels.

Further, as illustrated in FIG. 3B, the predetermined area may include displayed pixels and non-displayed pixels.

Accordingly, the corrected image may be formed by comparing, in step S360, the predetermined area of the real bill database with the predetermined area of the binary image, without the need for comparing the real bill database with the binary image across the whole area of the bill.

Figure 3C:
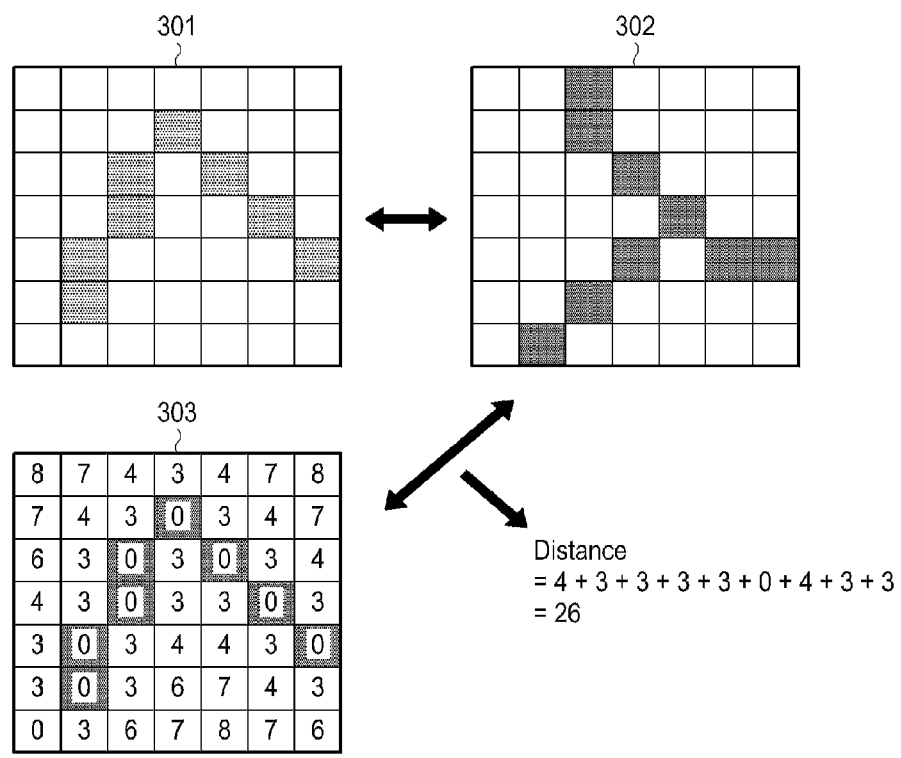
FIG. 3C is a conceptual view illustrating a method for comparing a predetermined area of a real bill database with a predetermined area of a binary image according to an embodiment of the present invention.

FIG. 3C illustrates a method for comparing a predetermined area of a real bill database with a predetermined area of a binary image according to an embodiment of the present invention.

Referring to FIG. 3C, a pixel group 301 corresponds to the predetermined area of the real bill database, occupying 7×7 pixels. The pixel group 301 includes displayed pixels and non-displayed pixels. However, a pixel group 302 corresponds to the predetermined area of the binary image, also occupying 7×7 pixels. The pixel group 302 also includes displayed pixels and non-displayed pixels.

The mobile communication device compares the real bill database to the binary image to determine the difference between the pixel group 301 of the predetermined area of the real bill database and the pixel group 302 of the predetermined area of the binary image. The pixel group 301 of the real bill database includes a distance value assigned to each pixel, which represents the distance of the pixel to a displayed pixel, as indicated by reference numeral 303.

For example, the distance value of each displayed pixel is 0 in the pixel group 303. A pixel directly adjacent to a displayed pixel has a distance value of 3. A distance value of 4 or 6 is assigned to a pixel adjacent to the directly adjacent pixel. In this manner, each pixel has a distance value such that a pixel farther from a displayed pixel has a higher distance value.

The mobile communication device calculates a sum of the distance values of the real bill database, corresponding to the displayed pixels of the pixel group 302 of the binary image. For example, the distance values of pixel (1, 3) and pixel (2, 3) of the pixel group 302 in the binary image are 4 and 3, respectively, in the real bill database. The sum of the distance values of the entire displayed pixels in the pixel group 302 is 26 in FIG. 3C. The mobile communication device may store the distance value sum, for example, 26, with the binary image.

Further, the mobile communication device may enlarge or contract the entire binary image at a predetermined ratio.

Figure 3D:
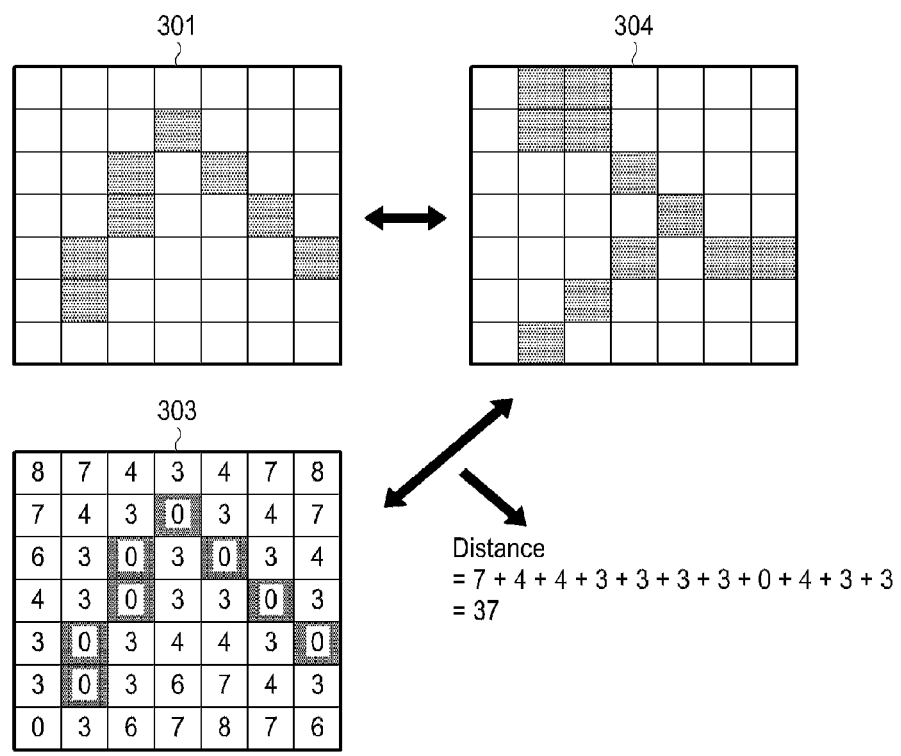
FIG. 3D illustrates a pixel group in a predetermined area of a binary image after a mobile communication device enlarges a binary image at a predetermined ratio, according to an embodiment of the present invention.

FIG. 3D illustrates a pixel group of a predetermined area in a binary image after a mobile communication device enlarges a whole binary image at a predetermined ratio.

Referring to FIG. 3D, a pixel group 304, which is enlarged at a predetermined ratio, includes displayed pixels and non-displayed pixels. The mobile communication device calculates the sum of the distance values of the displayed pixels in the pixel group 304 in the same manner as illustrated in FIG. 3C. The distance value sum is 37 in FIG. 53D.

The mobile communication device may then store both the distance value sum and the enlargement ratio.

The mobile communication device may repeat enlarging the binary image so that the binary image is enlarged further at a multiple of the predetermined enlargement ratio, or the mobile communication device may repeatedly contract the binary image a plurality of times at a multiple of a predetermined ratio.

In steps S370 and S380, the mobile communication device compares the stored distance value sums and determines a binary image with the smallest distance value sum as the corrected image.

Alternatively, the mobile communication device may determine the corrected image by moving the binary image up, down, to the left, or to the right in parallel in step S340.

Figure 3E:
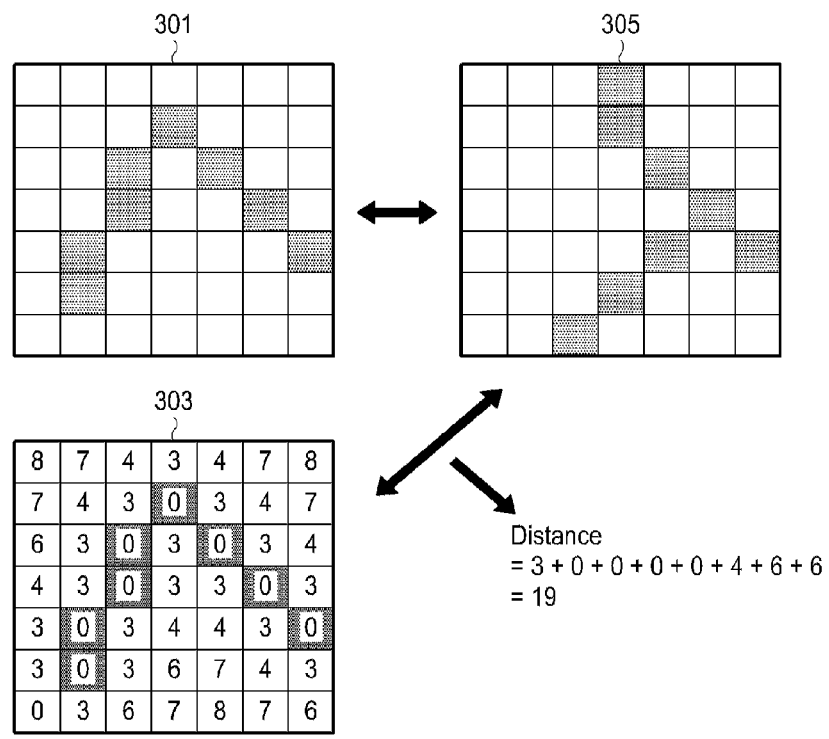
FIG. 3E illustrates a pixel group in a predetermined area of a binary image after a mobile communication device shifts a binary image to the right by one pixel in parallel, according to an embodiment of the present invention.

FIG. 3E illustrates a pixel group 305 of the predetermined area resulting from moving the binary image to the right in parallel by one pixel. The pixel group 305 includes displayed pixels and non-displayed pixels.

The mobile communication device calculates the sum of the distance values of the displayed pixels in the moved pixel group 305 in the same manner as illustrated in FIG. 3C. In FIG. 3E, the distance value sum is 19.

Thereafter, mobile communication device may store both the movement distance and the distance value sum.

The mobile communication device may repeat moving the binary image so that the binary image is moved for a multiple of the movement distance. Similarly, the mobile communication device may repeat moving the binary image in parallel up, down, to the right, or to the left so that the binary image is moved for a multiple of the movement distance.

Thereafter, the mobile communication device determines a binary image having a smallest distance value sum to be the corrected image by comparing the stored distance value sums in steps S370 and S380.

In step S350, the mobile communication device rotates the binary image at a predetermined angle and then calculates and store the sum of the distance values of displayed pixels in the rotated pixel group of the predetermined area. In addition, the mobile communication device may repeat rotating the binary image a plurality of times so that the binary image is rotated at a multiple of the predetermined angle and then calculate and store the distance value sum of displayed pixels in the resulting pixel group, each time the rotation is repeated.

Thereafter, mobile communication system determines a binary image having the smallest distance value sum to be the corrected image by comparing the stored distance value sums in steps S370 and S380.

Although FIG. 3A illustrates the mobile communication device performs steps S330, S340, or S350, the mobile communication device may perform movement, rotation, enlargement, and contraction in combination on the binary image, i.e., performs steps S330, S340, and S350.

When the smallest distance value sum of the displayed pixels in the predetermined area is equal to or larger than a predetermined threshold, the mobile communication device determines that the bill as counterfeit. To calculate a counterfeit probability, the mobile communication device a difference between a threshold and a smallest distance value sum and sets a higher counterfeit probability for a higher difference. That is, if the smallest distance value sum is equal to or larger than the threshold, the bill is judged as counterfeit. Thus, the counterfeit probability may be expressed as, for example, 50+(smallest distance value sum−threshold)× weight.

As described above, the mobile communication device can detect a counterfeit bill more accurately by minimizing the effects of a user's capturing motion, for example, hand tremors.

Figure 4A:
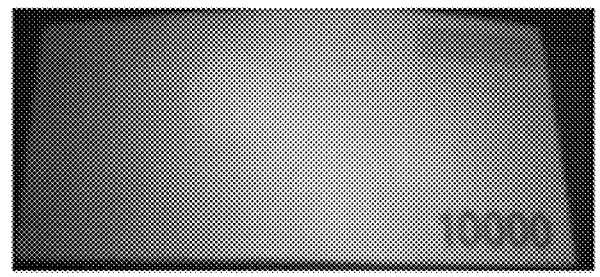
FIGS. 4A and 4B illustrate a corrected image according to an embodiment of the present invention.
Figure 4B:
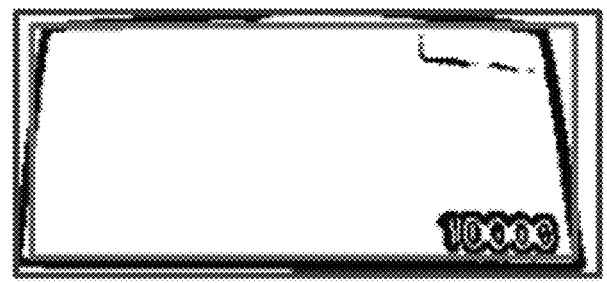

FIGS. 4A and 4B illustrate a corrected image according to an embodiment of the present invention.

Referring to FIGS. 4A and 4B, the corrected image includes an edge of a numeric denomination object "10000" at the bottom right-hand corner and the edge of a rectangle at the top right-hand corner. The corrected image also includes an edge corresponding to a periphery of the bill.

As illustrated in FIGS. 4A and 4B, the mobile communication device may exclude certain upper, lower, right and left areas from the corrected image, except for the edge corresponding to the periphery of the bill, thereby judging more accurately whether the bill is real or counterfeit.

The mobile communication device may determine whether the bill is real or counterfeit based on the number of displayed pixels in the corrected image from which the upper, lower, right and left areas are eliminated.

For example, the real bill database and the counterfeit bill database may have 200 displayed pixels and 800 displayed pixels, respectively. If the corrected image includes approximately 200 displayed pixels, the mobile communication device judges that the bill is real. However, if the corrected image includes approximately 800 displayed pixels, the mobile communication device judges that the bill is counterfeit.

Alternatively, when the bill includes 500 or more pixels being the average of the numbers of displayed pixels included in the real bill database and the counterfeit bill database, the mobile communication device judges that the bill is counterfeit. If the bill includes fewer pixels than 500, the mobile communication device judges that the bill is real.

The mobile communication device may express the determination result by the counterfeit probability of the bill. For example, the mobile communication device may set the ratio of the number of displayed pixels included in the corrected image to the number of displayed pixels included in the counterfeit bill database as the counterfeit probability of the bill.

Because the mobile communication device can judge whether the bill is counterfeit based on the number of displayed pixels without using a complex algorithm or comparison process, counterfeit detection is fast. In addition, the simple method above is more useful to a device that cannot be equipped with a high-integration computation device, such as a mobile communication device.

Figure 5:
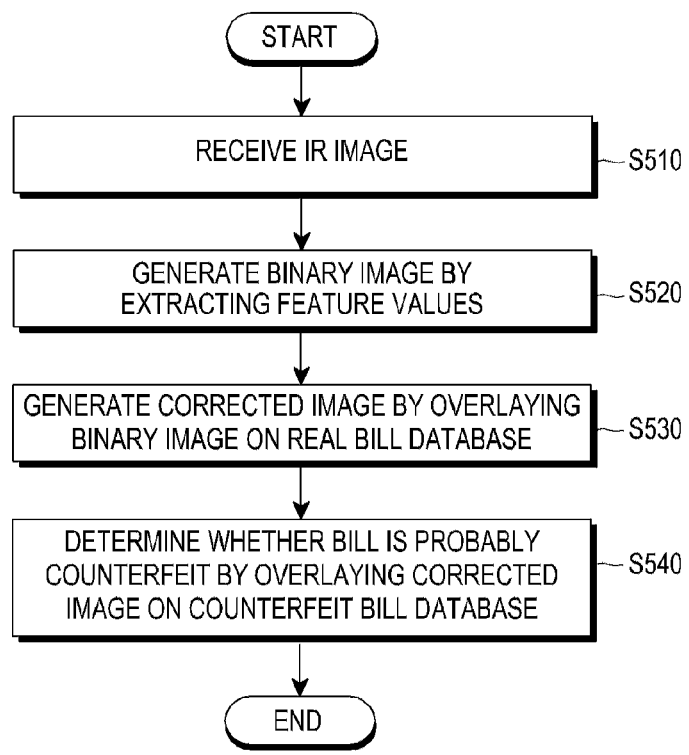
FIG. 5 is a flowchart illustrating a counterfeit bill identifying method according to an embodiment of the present invention.

FIG. 5 is a flowchart illustrating a counterfeit bill identifying method according to another embodiment of the present invention.

Referring to FIG. 5, steps S510, S520, and S530 of FIG. 5 are the same as steps S210, S220 and S230 of FIG. 2A, and thus, a repetitive description of these steps is not provided herein.

In step S540, the mobile communication device determines the whether a bill is counterfeit by directly overlaying a corrected image of the bill on a counterfeit bill database. For example, the mobile communication device determines whether the bill is counterfeit by checking whether pixels of the counterfeit bill database corresponding to displayed pixels of a corrected image are displayed pixels or non-displayed pixels.

Figure 6A:
FIG. 6A illustrates a counterfeit bill database according to an embodiment of the present invention.
Figure 6B:
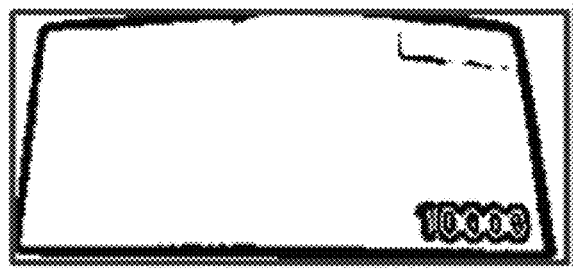
FIG. 6B illustrates a corrected image according to an embodiment of the present invention.

FIG. 6A illustrates a counterfeit bill database and FIG. 6B illustrates an corrected image according to an embodiment of the present invention. The mobile communication device compares the counterfeit bill database with the corrected image and determines whether a bill is counterfeit based on a matching rate between their pixels.

As the mobile communication device performs a comparison operation only on the displayed pixels of the corrected image, a counterfeit judgment time is shortened, making fast counterfeit detection possible.

While a determination as to whether a bill is counterfeit has been described above based on the number of displayed pixels in a corrected image in FIG. 2A and by overlaying a corrected image on a counterfeit bill database in FIG. 5, it may further be contemplated that after the mobile communication device determines whether the bill is counterfeit based on the number of displayed pixels in the corrected image, the corrected image is additionally overlaid on the counterfeit bill database, in order to more accurately determine whether the bill is counterfeit. It may also be contemplated that after it is determined whether the bill is counterfeit by overlaying the corrected image on the counterfeit bill database, a determination is additionally made based on the number of displayed pixels in the corrected image.

Figure 7:
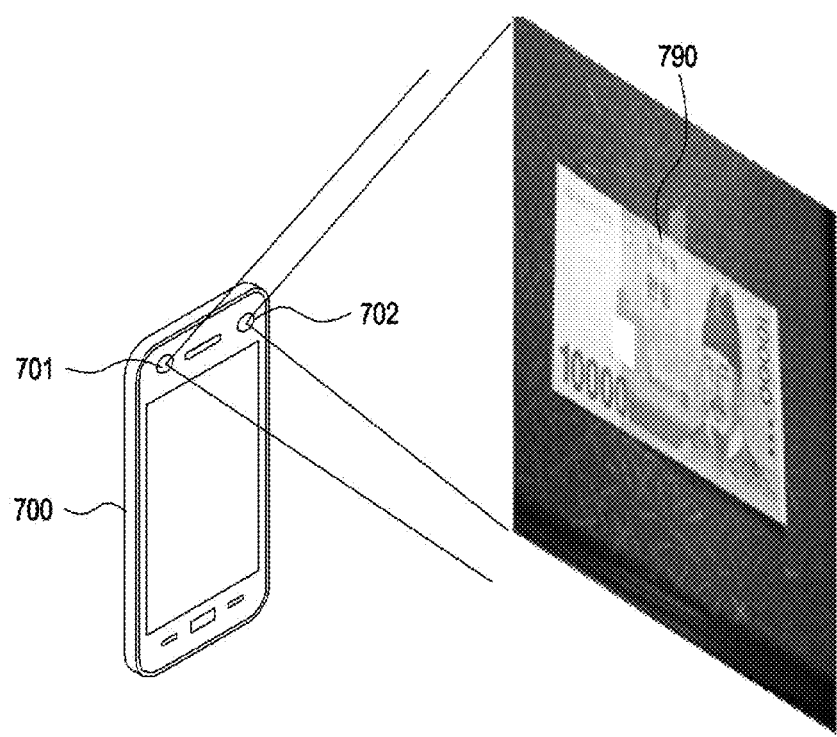
FIG. 7 is a conceptual view illustrating a mobile communication device according to an embodiment of the present invention.

FIG. 7 illustrates a mobile communication device according to an embodiment of the present invention.

Referring to FIG. 7, a mobile communication device 700 includes an IR emitter 701 and a camera module 702. The mobile communication device 700 projects IR light from the IR emitter 701 onto a bill 790, e.g., according to a user's manipulation.

Figure 2F:
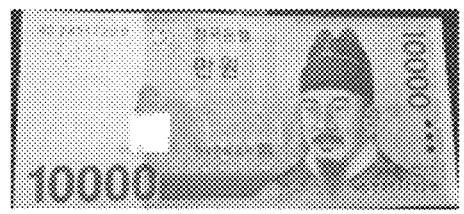
FIG. 2F illustrates an example of a visible-light image captured by a mobile communication device according to an embodiment of the present invention.
Figure 2G:
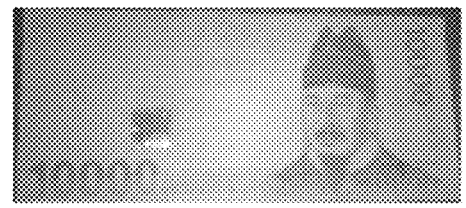
FIG. 2G illustrates an example of an infrared image captured by a mobile communication device according to an embodiment of the present invention.

IR light reflected from the bill 790 may be incident on the camera module 702. The camera module 702 receives an electromagnetic wave in an IR wavelength range and acquires an IR image through a visible light-cut filter accessory or internal camera filter switching. FIG. 2F illustrates an example of a visible-light image captured by a mobile communication device according to an embodiment of the present invention, and FIG. 2G illustrates an example of an IR image captured by a mobile communication device according to an embodiment of the present invention.

Figure 8:
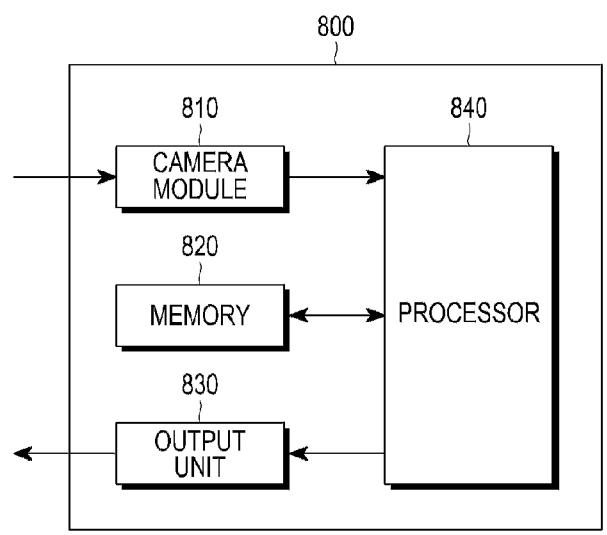
FIG. 8 is a block diagram illustrating a mobile communication device according to an embodiment of the present invention.

FIG. 8 is a block diagram illustrating a mobile communication device according to an embodiment of the present invention.

Referring to FIG. 8, a mobile communication device 800 includes a camera module 810, a memory 820, an output unit 830, and a processor 840. The camera module 810 captures an IR image of a bill. For example, the camera module 810 may be configured into a Complementary Metal Oxide Semiconductor (CMOS) or Charge Coupled Device (CCD) module.

The memory 820 stores a real bill database and a counterfeit bill database. As described above, the memory 820 may store a sum of distance values of a predetermined area in a binary image during correction of the binary image. Further, the memory 820 may store an algorithm for providing overall control to the mobile communication device 800, programs, or applications. For example, the memory 820 may include a Random Access Memory (RAM), Read Only Memory (ROM), Electrically Erasable and Programmable Read Only Memory (EEPROM), etc.

The processor 840 generates a binary image composed of displayed pixels and non-displayed pixels based on feature values extracted from the IR image to represent edges. As described above, the feature values may be determined by Sobel edge detection.

In addition, the processor 840 may compensate the feature values in such a manner that the histogram of the feature values determined by Sobel edge detection has a maximum variance and generate the binary image based on the compensated feature values.

The processor 840 generates a corrected image by overlaying the binary image on the real bill database read from the memory 820 and moving, rotating, enlarging, or contracting the binary image to match a predetermined area of the real bill database to the predetermined area of the binary image.

The processor 840 counts the number of displayed pixels in the corrected image to determine whether the bill is counterfeit based on the number of displayed pixels. For example, the processor 840 may be configured into a microprocessor, a mini-computer, or a computer.

The output unit 830 notifies the user that the bill is counterfeit. For example, the output unit 830 may be a Liquid Crystal Display (LCD).

When the processor 840 determines that the bill is not counterfeit based on the number of displayed pixels, it may then overlay the pre-stored counterfeit bill database composed of displayed pixels and non-displayed pixels on the corrected image and thus may further confirm whether the bill is counterfeit based on a matching rate between the displayed pixels of the corrected image and the displayed pixels of the counterfeit bill database.

In addition, the processor 840 may enlarge or contract the binary image a plurality of times at a multiple of a predetermined ratio, overlay the enlarged or contracted image on the real bill database, and calculate the sum of the distance values of displayed pixels of the binary image. The memory 820 may store the distance value sums resulting from the repeated enlarging or contracting operations. The processor 840 determines a binary image having the smallest of the stored distance value sums as the corrected image.

The processor 840 moves the binary image vertically or horizontally a plurality of times for a multiple of a predetermined distance, overlays the moved screen on the real bill database, and calculates a plurality of sums of the distance values of displayed pixels in the moved binary images. The memory 820 stores the plurality of distance value sums. The processor 840 determines a binary image having a smallest of the stored distance value sums as the corrected image.

The processor 840 may rotate the binary image a plurality of times at a multiple of a predetermined angle, overlay the rotated binary image on the real bill database, and calculate a plurality of sums of the distance values of displayed pixels in the rotated binary images. The memory 820 stores the plurality of distance value sums. The processor 840 determines a binary image having a smallest of the stored distance value sums as the corrected image.

When the smallest distance value sum is less than or equal to a threshold, the processor 840 judges the bill to be counterfeit.

Further, the processor 840 may count the number of displayed pixels in the remaining area, except for a predetermined peripheral area of the corrected image. If the number of displayed pixels is greater than or equal to a threshold, the processor 840 judges the bill to be counterfeit.

Alternatively, the processor 840 may calculate a ratio of the number of displayed pixels in the remaining area, except for the predetermined peripheral area of the corrected image, to the total number of pixels in the counter bill database. If the ratio is greater than or equal to a threshold, the processor 840 judges the bill to be counterfeit.

Figure 9:
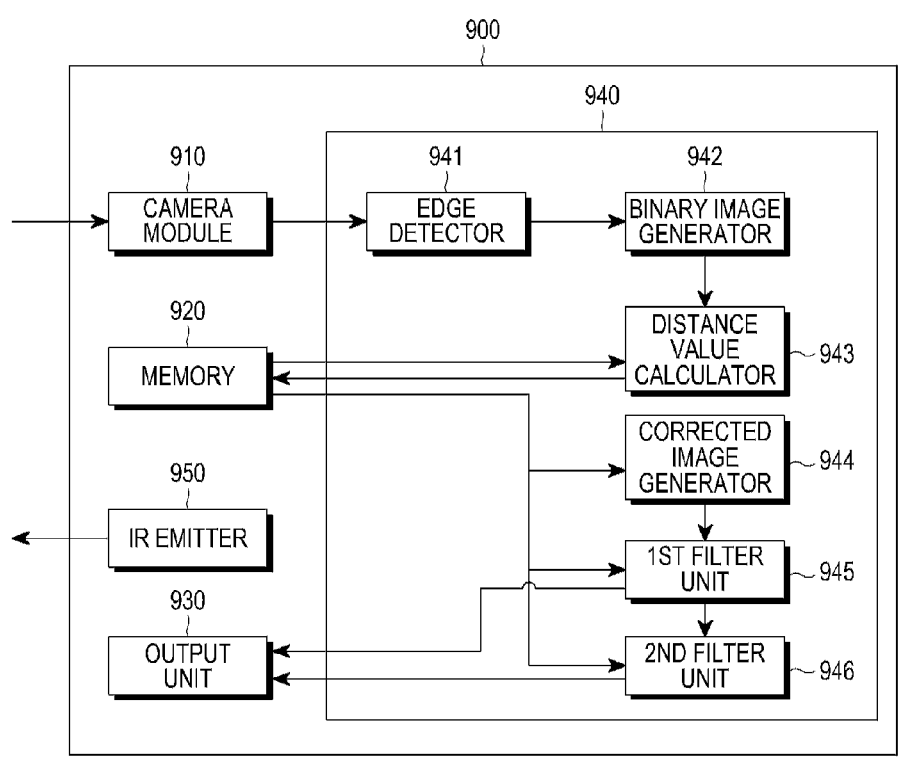
FIG. 9 is a block diagram illustrating a mobile communication device according to another embodiment of the present invention.

FIG. 9 is a block diagram illustrating a mobile communication device according to another embodiment of the present invention.

Referring to FIG. 9, a mobile communication device 900 includes a camera module 910, a memory 920, an output unit 930, a processor 940, and an IR emitter 950. The same components as illustrated in FIG. 8 will not be described, or will be briefly described, below.

The IR emitter 950 projects an electromagnetic wave in an IR wavelength range onto a bill according to a user's manipulation through an interface (not shown).

The processor 940 includes an edge detector 941, a binary image generator 942, a distance value calculator 943, a corrected image generator 944, a first filter unit 945, and a second filter unit 946. The edge detector 941 detects the edges of specific objects from an IR image received from the camera module 910. According to an embodiment of the present invention, the edge detector 941 detects feature values by Sobel edge detection, as described above.

The binary image generator 942 generates an accurate binary image by suppressing the effects of an ambient illumination environment by maximizing the variance of the feature values received from the edge detector 941, as described above.

The distance value calculator 943 reads a real bill database from the memory 920 and calculates a sum of distance values of a predetermined area of the binary image by comparing the predetermined area of the binary image generated from the binary image generator 942 with the predetermined area of the real bill database. In addition, the distance value calculator 943 may store the distance value sum in the memory 920.

The distance value calculator 943 may also move, rotate, enlarge, or contract the binary image, calculate the sum of distance values of the predetermined area of the binary image by comparing the predetermined area of the real bill database with the predetermined area of the moved, rotated, enlarged, or contracted binary image, and store the distance value sum in the memory 920.

The corrected image generator 944 determines a binary image having a smallest distance value sum as a corrected image.

The first filter unit 945 determines whether the bill is counterfeit based on a number of displayed pixels in the corrected image, using information about the numbers of displayed pixels included in the counterfeit bill database and real bill database read from the memory 920.

The second filter unit 946 determines whether the bill is counterfeit based on a pixel matching rate calculated by overlaying the counter bill database read from the memory 920 on the corrected image.

The output unit 930 may output one or both of the counterfeit probabilities received from the first and second filter units 945 and 946, or the output unit 930 may apply appropriate weights to the counterfeit probabilities and thus output the resulting counterfeit probability.

As is apparent from the description above, the various embodiments of the present invention provide a mobile communication device and method for identifying a counterfeit bill by suppressing effects of a user capturing motion or an ambient environment. Because the mobile communication device can identify a counterfeit bill easily and reliably without the need of an additional device, the mobile communication device is very cost-effective.

Furthermore, due to the portability of the mobile communication device, a user can spot a counterfeit bill easily without temporal and spatial restrictions. Because a counterfeit bill database and a real bill database can be updated at any time according to the characteristics of the mobile communication device, counterfeit detection reliability can be increased. If a recommended database for each nation is additionally updated, a counterfeit bill can be detected regarding a recommended bill of any nation.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for identifying a counterfeit bill in a mobile device, the method comprising the steps of:
receiving, by the mobile device, an InfraRed (IR) image of a bill;
extracting feature values that represent edges from the IR image;
generating a binary image having displayed pixels and non-displayed pixels based on the feature values;
generating a corrected image by overlaying the binary image on a pre-stored real bill database and adjusting the binary image to match a predetermined area of the binary image matches to a predetermined area of the real bill database;
counting a number of displayed pixels in the corrected image; and
determining whether the bill is counterfeit based on the number of displayed pixels in the corrected image.

2. The method of claim 1, further comprising:
overlaying a pre-stored counterfeit bill database including displayed pixels and non-displayed pixels on the corrected image; and
confirming whether the bill is counterfeit based on a displayed pixel matching rate between the corrected image and the counterfeit bill database.

3. The method of claim 1, wherein generating the corrected image comprises:
   reading a pre-stored real bill database having a distance value representing a distance to a displayed pixel for each pixel;
   enlarging or contracting the binary image a plurality of times at a multiple of a predetermined ratio;
   overlaying the enlarged or contracted binary images on the real bill database;
   calculating a plurality of sums of distance values of displayed pixels in the enlarged or contracted binary images;
   storing the plurality of distance value sums; and
   determining a binary image having a smallest of the plurality of distance value sums as the corrected image.

4. The method of claim 3, wherein generating the corrected image further comprises:
   comparing the smallest distance value sum to a threshold;
   determining the bill as a counterfeit bill, when the smallest distance value sum is greater than or equal to the threshold; and
   determining the bill is not counterfeit, when the smallest distance value sum is less than the threshold.

5. The method of claim 1, wherein generating the corrected image comprises:
   reading a pre-stored real bill database having a distance value representing a distance to a displayed pixel for each pixel;
   moving the binary image vertically or horizontally a plurality of times for a multiple of a predetermined distance;
   overlaying the moved binary images on the real bill database;
   calculating a plurality of sums of distance values of displayed pixels in the moved binary images;
   storing the plurality of distance value sums; and
   determining a binary image having a smallest of the plurality of distance value sums as the corrected image.

6. The method of claim 1, wherein generating the corrected image comprises:
   reading a pre-stored real bill database having a distance value representing a distance to a displayed pixel for each pixel;
   rotating the binary image a plurality of times at a multiple of a predetermined angle;
   overlaying the rotated binary images on the real bill database;
   calculating a plurality of sums of distance values of displayed pixels in the rotated binary images;
   storing the plurality of distance value sums; and
   determining a binary image having a smallest of the plurality of distance value sums as the corrected image.

7. The method of claim 1, wherein determining whether the bill is counterfeit comprises:
   counting a number of displayed pixels in a remaining area, except for a predetermined peripheral area of the corrected image; and
   determining the bill as a counterfeit bill, if the number of displayed pixels in the remaining area is greater than or equal to a threshold.

8. The method of claim 1, wherein determining whether the bill is counterfeit comprises:
   calculating a ratio of a number of displayed pixels in a remaining area, except for a predetermined peripheral area of the corrected image to a total number of pixels in a counterfeit bill database; and
   determining the bill as a counterfeit bill, if the ratio is greater than or equal to a threshold.

9. The method of claim 1, wherein extracting the feature values comprises extracting magnitude values from the IR image by Sobel edge detection.

10. The method of claim 9, wherein generating the binary image further comprises:
   determining the feature values to maximize a variance in a histogram of the magnitude values determined by the Sobel edge detection; and
   generating the binary image using the determined feature values.

11. A method for identifying a counterfeit bill by a mobile device, the method comprising:
   receiving, by the mobile device, an InfraRed (IR) image of a bill;
   extracting feature values that represent edges from the IR image;
   generating a binary image having displayed pixels and non-displayed pixels based on the feature values;
   generating a corrected image by overlaying the binary image on a pre-stored real bill database and adjusting the binary image to match a predetermined area of the binary image to a predetermined area of the real bill database;
   overlaying a pre-stored counterfeit bill database having displayed pixels and non-displayed pixels on the corrected image; and
   determining whether the bill is counterfeit based on a matching rate between the displayed pixels of the corrected image and the displayed pixels of the counterfeit bill database.

12. A mobile communication device comprising:
   a camera module for receiving an InfraRed (IR) image of a bill;
   a memory for storing a real bill database;
   a processor for extracting feature values that represent edges from the IR image, generating a binary image having displayed pixels and non-displayed pixels based on the feature values, generating a corrected image by overlaying the binary image on the real bill database read from the memory and adjusting the binary image to match a predetermined area of the binary image to a predetermined area of the real bill database, counting a number of displayed pixels in the corrected image, and determining whether the bill is counterfeit based on the number of displayed pixels in the corrected image; and
   an output unit for notifying whether the bill is counterfeit based on the determination.

13. The mobile communication device of claim 12, wherein the processor overlays a pre-stored counterfeit bill database including displayed pixels and non-displayed pixels on the corrected image and confirms whether the bill is counterfeit based on a displayed pixel matching rate between the corrected image and the counterfeit bill database.

14. The mobile communication device of claim 12, wherein the real bill database stored in the memory includes a distance value representing a distance to a displayed pixel for each pixel, and the processor enlarges or contracts the binary image a plurality of times at a multiple of a predetermined ratio, overlays the enlarged or contracted binary images on the real bill database, calculates a plurality of sums of distance values of displayed pixels in the enlarged or contracted binary images, stores the plurality of distance value sums in the memory, and determines a binary image having a smallest of the plurality of distance value sums as the corrected image.

15. The mobile communication device of claim 14, wherein the processor compares the smallest distance value sum to a threshold, determines the bill as a counterfeit bill, when the smallest distance value sum is greater than or equal to the threshold, and determines the bill is not counterfeit, when the smallest distance value sum is less than the threshold.

16. The mobile communication device of claim 12, wherein the real bill database stored in the memory includes a distance value representing a distance to a displayed pixel for each pixel, and the processor moves the binary image vertically or horizontally a plurality of times for a multiple of a predetermined distance, overlays the moved binary images on the real bill database, calculates a plurality of sums of distance values of displayed pixels in the moved binary images, stores the plurality of distance value sums in the memory, and determines a binary image having a smallest of the plurality of distance value sums as the corrected image.

17. The mobile communication device of claim 12, wherein the real bill database stored in the memory includes a distance value representing a distance to a displayed pixel for each pixel, and the processor rotates the binary image a plurality of times at a multiple of a predetermined angle, overlays the rotated binary images on the real bill database, calculates a plurality of sums of distance values of displayed pixels in the rotated binary images, stores the plurality of distance value sums in the memory, and determines a binary image having a smallest of the plurality of distance value sums as the corrected image.

18. The mobile communication device of claim 12, wherein the processor counts a number of displayed pixels in a remaining area, except for a predetermined peripheral area of the corrected image, and determines the bill as a counterfeit bill, if the number of displayed pixels in the remaining area is greater than or equal to a threshold.

19. The mobile communication device of claim 12, wherein the processor calculates a ratio of a number of displayed pixels in a remaining area, except for a predetermined peripheral area of the corrected image to a total number of pixels in a counterfeit bill database, and determines the bill as a counterfeit bill, if the ratio is greater than or equal to a threshold.

20. The mobile communication device of claim 12, wherein the processor extracts the feature values by extracting magnitude values by Sobel edge detection.

21. The mobile communication device of claim 20, wherein the processor determines the feature values to maximize a variance in a histogram of the magnitude values determined by the Sobel edge detection and generates the binary image using the feature values.

22. The mobile communication device of claim 12, further comprising an IR emitter for projecting IR light onto the bill,
wherein the camera module includes a visible light cut-filter device.

23. A mobile communication device comprising:
a camera module for receiving an InfraRed (IR) image of a bill;
a memory for storing a real bill database and a counterfeit bill database having displayed pixels and non-displayed pixels;
a processor for extracting feature values that represent edges from the IR image, generating a binary image having displayed pixels and non-displayed pixels based on the feature values, generating a corrected image by overlaying the binary image on the real bill database read from the memory and adjusting the binary image to match a predetermined area of the binary image to a predetermined area of the real bill database, overlaying the counterfeit bill database on the corrected image, and determining whether the bill is counterfeit based on a matching rate between the displayed pixels of the corrected image and the displayed pixels of the counterfeit bill database.

* * * * *